US007916669B2

(12) United States Patent
Bou-Diab et al.

(10) Patent No.: US 7,916,669 B2
(45) Date of Patent: Mar. 29, 2011

(54) METHOD AND SYSTEM FOR STP-AWARE SUBSCRIBER MANAGEMENT

(75) Inventors: Bashar Said Bou-Diab, Ottawa (CA); John Coulter, Richmond (CA)

(73) Assignee: Alcatel Lucent, Paris (FR)

( * ) Notice: Subject to any disclaimer, the term of this patent is extended or adjusted under 35 U.S.C. 154(b) by 43 days.

(21) Appl. No.: 12/347,530

(22) Filed: Dec. 31, 2008

(65) Prior Publication Data

US 2010/0165986 A1 Jul. 1, 2010

(51) Int. Cl.
  *H04L 12/28* (2006.01)
(52) U.S. Cl. ......... 370/256; 370/244; 370/252; 370/258
(58) Field of Classification Search .................. 370/256, 370/352, 389, 228, 218, 252, 449, 235, 395.2, 370/216, 465, 397
See application file for complete search history.

(56) References Cited

U.S. PATENT DOCUMENTS

| 6,278,694 | B1 * | 8/2001 | Wolf et al. | 370/253 |
| 6,968,392 | B1 * | 11/2005 | Wilford et al. | 709/240 |
| 7,782,760 | B2 * | 8/2010 | Froroth et al. | 370/216 |
| 7,787,385 | B2 * | 8/2010 | Wybenga et al. | 370/242 |
| 7,808,918 | B2 * | 10/2010 | Bugenhagen | 370/242 |
| 2008/0304428 | A1 * | 12/2008 | Stilling et al. | 370/256 |
| 2009/0059812 | A1 * | 3/2009 | Chinnaswamy et al. | 370/253 |

* cited by examiner

*Primary Examiner* — Michael J Moore, Jr.
(74) *Attorney, Agent, or Firm* — Kramer & Amado, PC

(57) ABSTRACT

A method and system for STP-aware subscriber management is disclosed for managing redundant access ports. The STP-aware system includes Access Loop Pairs which provide continuity of subscriber management information in the event of an access port failure. The STP-aware subscriber management system is particularly useful for overcoming the requirements for extra ports within Link Access Group configured access networks known in the art.

9 Claims, 3 Drawing Sheets

METHOD AND SYSTEM FOR STP-AWARE SUBSCRIBER MANAGEMENT

FIELD OF THE INVENTION

The invention relates to broadband Internet access subscriber management and is particularly concerned with subscriber management used over redundant access ports.

BACKGROUND OF THE INVENTION

Spanning Tree Protocol (STP) allows redundant LAN (Local Area Network) links to be used while preventing frames from looping around the LAN indefinitely through the redundant links. In the implementation of the protocol, loops are discovered before the links comprising them are opened for use, and redundant links are placed in a blocking or standby state to prevent frame forwarding. In the event that a forwarding port becomes disabled or fails in some manner, the Spanning Tree Algorithm is reapplied to recalculate a new topology so that blocked connections can be made operational by activating links that were previously in a blocked or standby state.

In the implementation of a network of DSLAMs (Digital Subscriber Line Access Modules) that are connected to a bridged CO (Central Office) over a ring, STP is used to manage the loop that arises when a ring topology is used. Referring to FIG. 1 there may be seen an Ethernet switch 100 connected to an IP Network 110. Ethernet switch 100 also connects to links 101 and 103 via Ethernet ports 102 and 104 respectively. A plurality of DSLAMs are connected to the Ethernet switch 100. DSLAM 120 connects to link 101 via port 122 and DSLAM 140 connects to link 103 via port 144. DSLAM 120 also connects via port 124 to link 105, and DSLAM 140 connects to link 107 via port 142. Further, DSLAM 130 connects to link 105 via its port 132, and to link 107 via its port 134. Further, each DSLAM connects to a group of digital broadband subscribers, namely DSLAM 120 to subscribers 150a-150d, DSLAM 130 to subscribers 160a-160d, and DSLAM 140 to subscribers 170a-170d.

It may be seen that links 101, 103, 105 and 107 define a switched loop configuration, connecting DSLAMS 120, 130 and 140 to Ethernet switch 100. The loop configuration provides link redundancy, as should any single link fail, the DSLAM connected to the link may still establish a connection to the Ethernet switch 100 via the port connected to the non-failed link.

When the Spanning Tree Algorithm is implemented upon this switched loop, one of the DSLAM ports will be redundant and placed in a blocked or standby state. Upon a link failure, a re-computing of the spanning tree structure will be initiated, and the unused port will be recruited into the new Spanning Tree.

Variants of SPT include RSPT (Rapid Spanning Tree Protocol) and MSTP (Multiple Spanning Tree Protocol). RSPT provides for faster spanning tree computation after a topology change; whereas STP requires on the tens of seconds (typically 30 to 50 seconds) RSTP is typically able to respond to changes within a second. MSTP is an extension of RSTP to Virtual Local Area Networks (VLANs). This protocol computes a separate spanning tree for each VLAN group and blocks the loops which are redundant within each spanning Subscriber management is concerned with enforcing subscriber Quality of Service (QoS) and accounting profiles over a service VLAN (in the VLAN per service model) or subscriber VLAN (in the VLAN per subscriber model). Ingress and egress subscriber traffic need to be queued at the proper port leading the subscriber. As well, operational statistics for each subscriber needs to be maintained in order to implement subscriber management policies.

In the event of a port failure, the network will reconfigure via the Spanning Tree Protocol. However, any new port recruited by the protocol will be starting from zero regarding operational statistics, thus leading to potential One possible remedy for this would be to utilize Link Aggregation Groups (LAGs) in the links. Referring to FIG. 2 [note: like references denote like elements in the following Figures] there may be seen a plurality of DSLAMs 220, 230 and 240 connected to an Ethernet switch 200 in a loop configuration. The number of links comprising the loop configuration has been doubled over the network depicted in FIG. 1, also requiring double the number of ports at the Ethernet switch 200 and the DSLAMs. A Link Aggregation Group may be defined grouping links together, for example link 201a and 201b. This is normally done to provide more bandwidth, but could also serve to enhance subscriber traffic management reliability, as if a single port fails, the remaining port within the LAG can still provide the necessary history and statistics.

A disadvantage of using LAGs to obtaining this increased reliability may be the increased cost in terms of links and ports that need to be provisioned to support LAG operation.

SUMMARY OF THE INVENTION

An object of the present invention is to provide an improved method and system for STP-aware subscriber management.

According to an aspect of the present invention there is provided a system for providing subscriber management in an STP network. The system includes a broadband switch having a plurality of Ethernet ports; and at least one DSLAM. The DSLAM has a pair of Ethernet ports connecting to the broadband switch in a loop configuration. The broadband switch and DSLAM are operating under at least one of the set of protocols of Spanning Tree Protocol, Rapid Spanning Tree Protocol, and Multiple Spanning Tree Protocol. The pair of Ethernet ports of said at least one DSLAM are configured into an Access Loop Pair.

Advantageously, Service Access Points are associated to the Access Loop Pair. In the system subscriber ingress queues, egress queues, ingress counters, egress counters, and anti-spoofing entries are associated to both ports of the Access Loop Pair.

Also advantageously, the ingress counters and egress counters may be polled at the same time for both ports of the ALP. A switch control module contained in the broadband switch may add both ingress counters together, and likewise add both egress counters together to generate subscriber counters. Said subscriber counters may be stored in a subscriber management information base.

Under some configurations the broadband switch is an Ethernet switch.

According to another aspect of the invention there is provided a method for managing subscribers in an STP network having an Ethernet loop ring connection from a broadband switch to a plurality of DSLAMs wherein each DSLAM has a pair of Ethernet ports connecting the DSLAM to the Ethernet loop. The method includes the steps of for each of the plurality of DSLAMs, configuring the Ethernet port connections into an Access Loop Pair; and associating Service Access Points to the access loop pair.

Advantageously, the further step of instantiating subscriber ingress queues, egress queues, ingress counters, egress counters, and anti-spoofing entries to both ports of the Access Loop Pair is done.

Ingress counters and egress counters may be polled at the same time for both ports of the ALP; and subscriber counters may be generated by adding both ingress counters together, and likewise adding both egress counters together. The subscriber counters may be forwarded to a subscriber management information base.

BRIEF DESCRIPTION OF THE DRAWINGS

The present invention will be further understood from the following detailed description of embodiments of the invention, with reference to the drawings in which.

DETAILED DESCRIPTION

Figure 1:
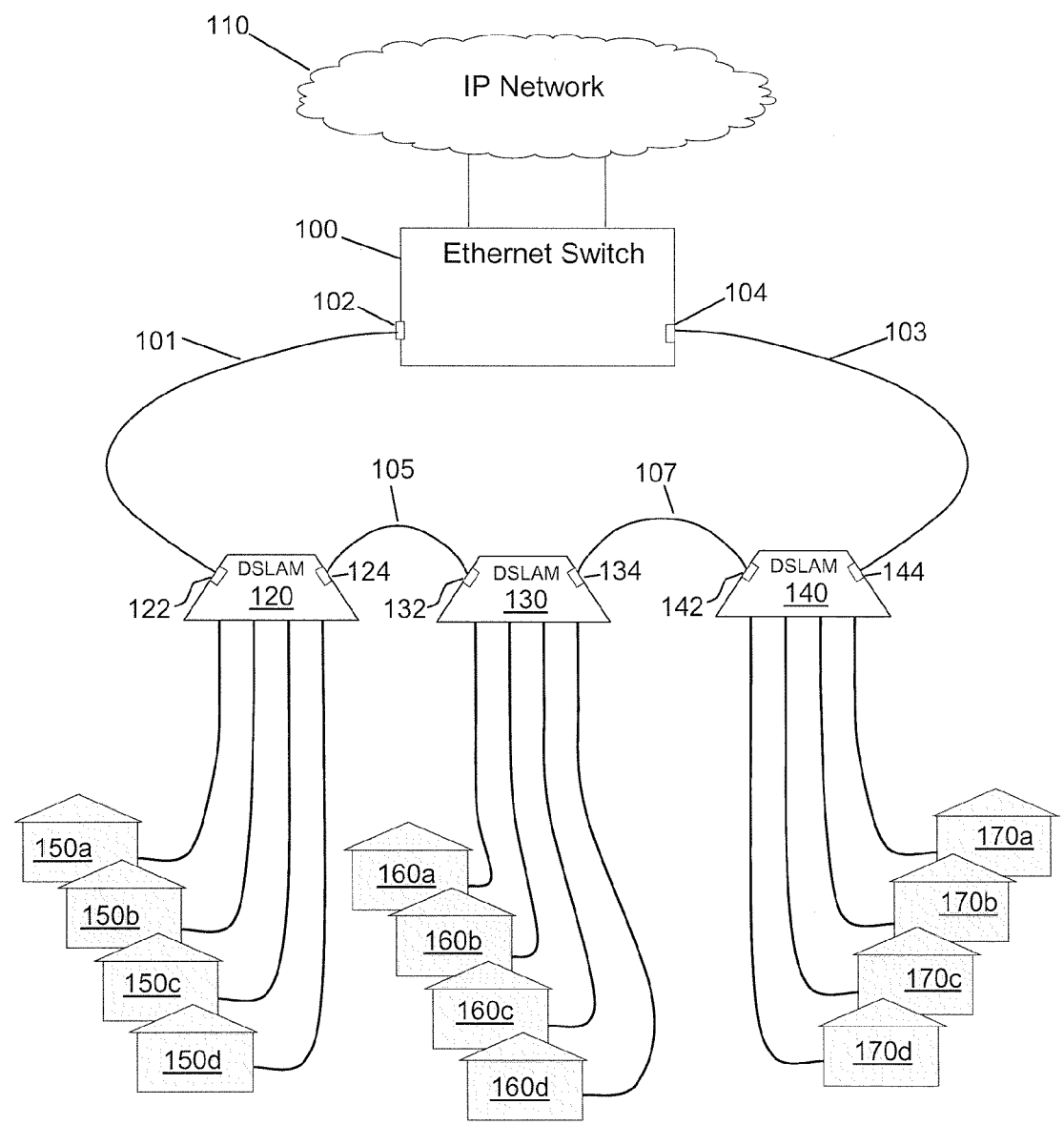
FIG. 1 illustrates a known edge network of an Ethernet switch connected via Ethernet links to a plurality of DSLAMs in a loop configuration.
Figure 2:
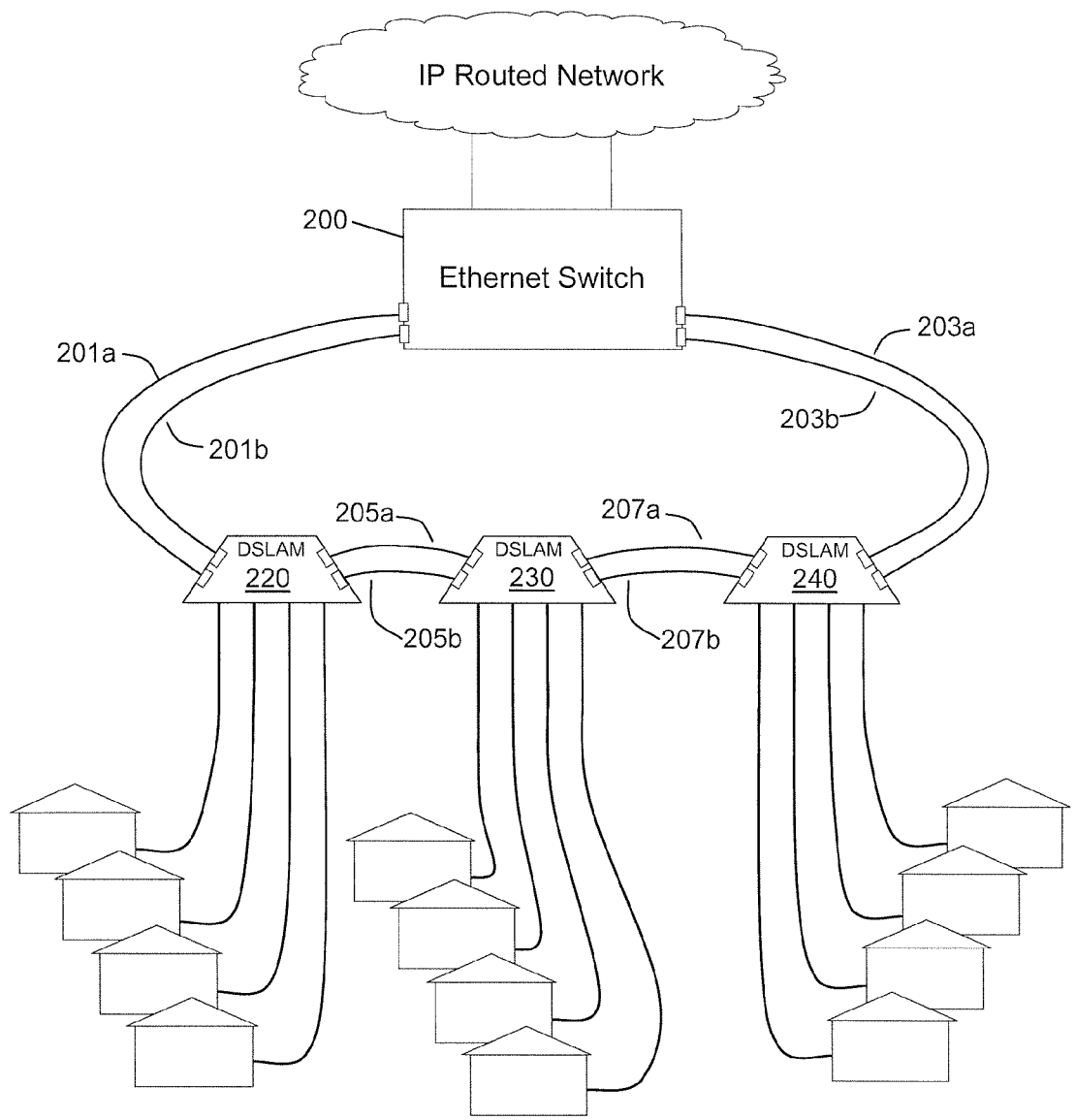
FIG. 2 illustrates a known edge network of an Ethernet switch connected via Ethernet links to a plurality of DSLAMs in a loop configuration wherein the network is able to support Link Aggregation Groups.
Figure 3:
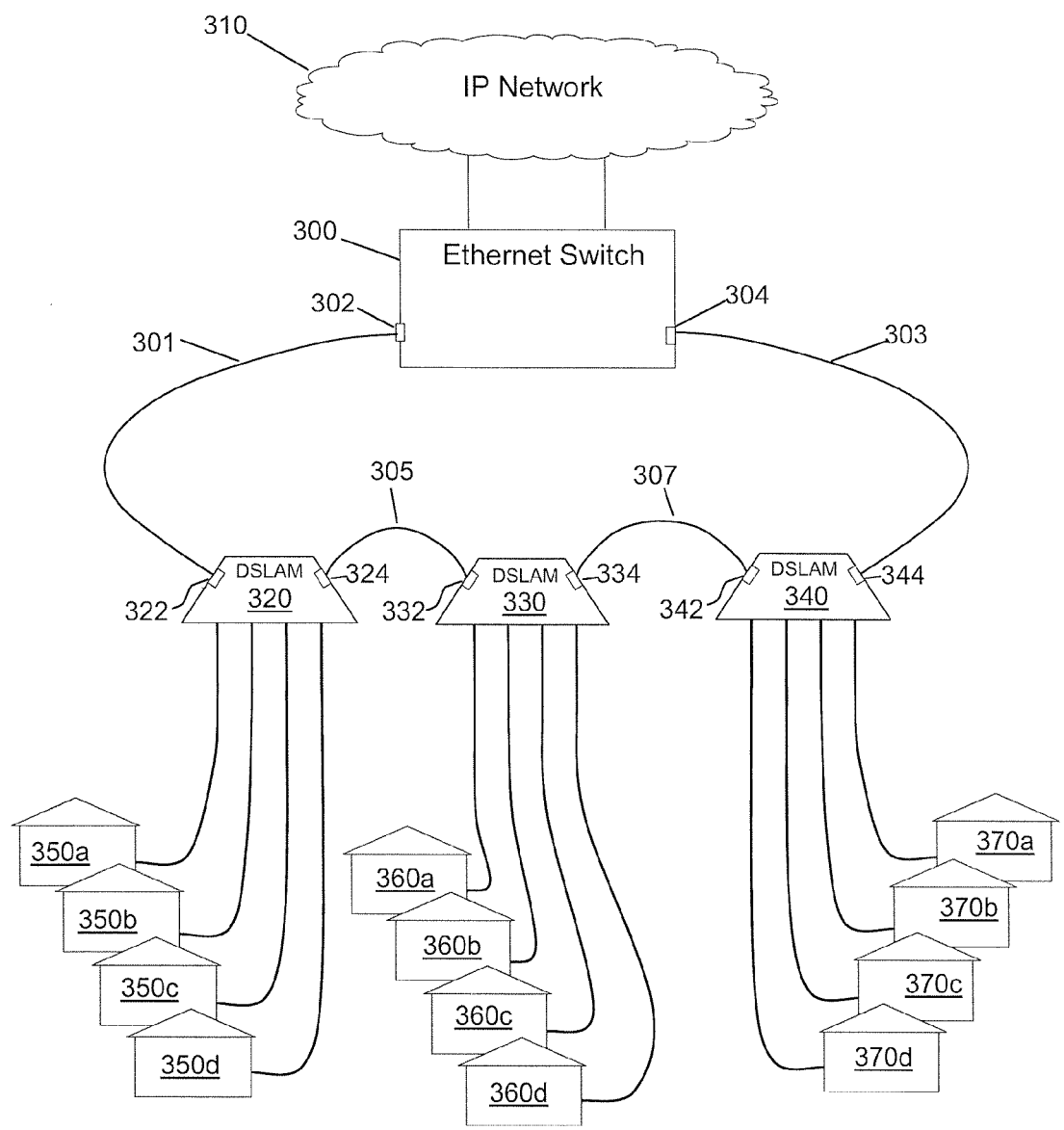
FIG. 3 illustrates an edge network of an Ethernet switch connected via Ethernet links to a plurality of DSLAMs in a loop configuration in accordance with an embodiment of the present invention.

Referring to FIG. 3, there may be seen an Ethernet switch 300 connected to an IP Network 330. Ethernet switch 300 also connects to links 301 and 303 via Ethernet ports 302 and 304 respectively. A plurality of DSLAMs are connected to the Ethernet switch 300. DSLAM 320 connects to link 301 via port 322 and DSLAM 340 connects to link 303 via port 344. DSLAM 320 also connects via port 324 to link 305, and DSLAM 340 connects to link 307 via port 342. Further, DSLAM 330 connects to link 305 via its port 332, and to link 307 via its port 334. Further, each DSLAM connects to a group of digital broadband subscribers, namely DSLAM 320 to subscribers 350a-350d, DSLAM 330 to subscribers 360a-360d, and DSLAM 340 to subscribers 370a-370d.

It may be seen that links 301, 303, 305 and 307 define a switched loop configuration, connecting DSLAMS 320, 330 and 340 to Ethernet switch 300.

According to an embodiment of the invention the two Ethernet switch ports that are connected to the DSLAM are paired into an ALP (Access Loop Pair). This pairing is done at configuration time by manually configuring an ALP.

Service and/or subscriber SAPs (Service Access Points) are associated with the ALP (Access Loop Pair) rather than the ports. An ALP (Access Loop Pair) is similar to a LAG (Link Aggregation Group) from this perspective.

Subscriber ingress queues, egress queues, ingress counters, egress counters, and anti-spoofing entries are instantiated on both ports of the ALP. This may be done either at configuration time for static hosts or be triggered by the dynamic subscriber host configuration process, such as DHCP or PPP IPCP (IP Control Protocol).

Ingress and egress subscriber counters are polled at the same time from the line cards for both ports of the ALP and are added together in the switch control module to obtain the subscriber counters, which are prepared in MIBs (Management Information Bases) for the management system.

Subscriber application queues are assigned full subscriber rates at ingress and egress on both ALP ports. The anti-spoofing table on the control module and the line cards associates subscriber IP and MAC addresses to the ALP construct rather than the port.

Referring again to FIG. 3, ports 302 and 304 would be configured as a first ALP. As well, port pairs 322 and 324; pairs 332 and 334; and pairs 342 and 344 would also respectively be configured as separate ALPs.

Variants of STP, such as RSTP (Rapid Spanning Tree Protocol), and MSTP (Multiple Spanning Tree Protocol) are enabled on the ALP ports. The MSTP is the more common option due to its ability to control multiple service or subscriber VLANs with one MSTP control instance.

In operation, DSLAMs are expected to pass STP control PDUs (Protocol Data Units) transparently without participating in the protocol.

STP controls the switching from the ingress network cards to the proper egress access cards when only one of the ALP ports is in the forwarding state.

VPLS MAC (Media Access Control address) learning in the bridged CO resolves subscriber MACs to forwarding ports on the Ethernet switch. In normal state of operations, only one port is forwarding. However, both ALP (Access Loop Pair) ports may be in the forwarding state during a link break between the DSLAMs.

As may be seen, the use of ALPs provides network operators automated subscriber management alongside inexpensive STP based redundancy in access without requiring additional switch ports.

Numerous modifications, variations and adaptations may be made to the embodiment of the invention described above without departing from the scope of the invention, which is defined in the claims.

What is claimed is:

1. A system for providing subscriber management in a Spanning Tree Protocol (STP) network, said system comprising:
    a broadband switch having a plurality of Ethernet ports;
    at least one Digital Subscriber Line Access Multiplexer [DSLAM], having a pair of Ethernet ports connecting the at least one DSLAM to the broadband switch in a loop configuration;
    said broadband switch and said at least one DSLAM operating under at least one of the set of protocols of Spanning Tree Protocol STP, Rapid Spanning Tree Protocol (RSTP), and Multiple Spanning Tree Protocol (MSTP), wherein said pair of Ethernet ports of said at least one DSLAM is configured into an access loop pair (ALP), wherein both ports of the ALP have ingress counters and egress counters, and wherein the ingress counters and the egress counters are polled at a same time from line cards for both ports of the ALP.

2. A system as claimed in claim 1, wherein Service Access Points are associated to the access loop pair.

3. A system as claimed in claim 2, wherein subscriber ingress queues, egress queues, ingress counters, egress counters, and anti-spoofing entries are associated to both ports of the access loop pair ALP.

4. A system as claimed in claim 3, wherein said ingress counters and said egress counters are polled at the same time for both ports of the ALP; and a switch control module contained in said broadband switch adds both ingress counters together, and likewise adds both egress counters together to generate subscriber counters.

5. The system of claim 1, wherein said broadband switch is an Ethernet switch.

6. A method for managing subscribers in a Spanning Tree Protocol (STP) network having an Ethernet loop ring connection from a broadband switch to a plurality of Digital Subscriber Line Access Multiplexers [DSLAMs], wherein each DSLAM has a pair of Ethernet ports connecting the DSLAM to the Ethernet loop, said method comprising the steps of:

for each of said plurality of DSLAMs, configuring the Ethernet port connections into an access loop pair;

associating Service Access Points to the access loop pair (ALP), wherein both ports of the ALP have ingress counters and egress counters; and polling the ingress counters and the egress counters at a same time from line cards for both ports of the ALP.

7. A method as claimed in claim 6, further comprising: the further step of instantiating subscriber ingress queues, egress queues, ingress counters, egress counters, and anti-spoofing entries to both ports of the access loop pair ALP.

8. A method as claimed in claim 7, further comprising: the further step of polling said ingress counters and said egress counters at the same time for both ports of the ALP; and adding both ingress counters together, and likewise adding both egress counters together to generate subscriber counters.

9. A method as claimed in claim 8, further comprising: the further step of forwarding said subscriber counters to a subscriber management information base.

\* \* \* \* \*